3,342,846
ASYMMETRICAL DIISOTHIOCYANATO BENZENES
André Cometti, Maisons-Alfort, and Francois Debarre, Antony, France, assignors to Rhone-Poulenc S.A., Paris, France, a French body corporate
No Drawing. Filed Jan. 20, 1964, Ser. No. 338,593
Claims priority, application France, Jan. 21, 1963, 922,065; Nov. 20, 1963, 954,419
6 Claims. (Cl. 260—454)

This invention relates to new isothiocyanates having chemotherapeutic properties, to processes for their preparation, and to compositions containing them.

According to the present invention, there are provided the new isothiocyanate compounds of the general formula:

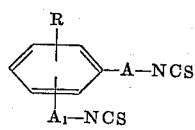
I wherein A represents a single bond, or a straight- or branched-chain alkylene group containing 1 to 6 carbon atoms which may be attached to the phenyl nucleus through an oxygen or sulphur atom or a sulphonyl, —NHCO— or —CONH— group, $A_1$ represents a straight- or branched-chain alkylene group containing 1 to 6 carbon atoms which may be attached to the phenyl nucleus through an oxygen or sulphur atom or a sulphonyl, —NHCO— or —CONH— group, and R represents a hydrogen or halogen atom, an alkyl, alkoxy or alkylthio group containing 1 to 4 carbon atoms, or a hydroxy, nitro, cyano or trifluoromethyl group.

The aforesaid isothiocyanates may be prepared by the application of methods described in the literature for the preparation of isothiocyanates from the corresponding amines or halogenated derivatives. According to a feature of this invention, they are prepared by the reaction of thiophosgene ($CSCl_2$) with a diamine of the general formula:

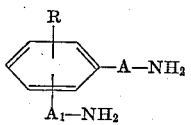
II wherein the various symbols are as hereinbefore defined or an acid addition salt, e.g. dihydrochloride, thereof. The reaction is carried out in the presence of an excess of thiophosgene and at or near the ambient temperature, preferably between 0° and 30° C. It is preferably effected in water in the presence of a basic acid-binding agent capable of neutralizing the hydrochloric acid formed in the course of the reaction, for example calcium carbonate or sodium hydroxide.

According to a further feature of the invention, the isothiocyanate compounds of Formula I are prepared by the reaction of carbon disulphide and an alkali metal or ammonium hydroxide with a diamine of Formula II, followed by decomposition of the resulting dithiocarbamate of the general formula:

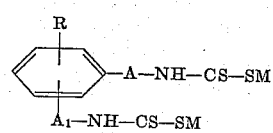
III wherein M represents an alkali metal atom or ammonium ion, and A, $A_1$ and R are as hereinbefore defined. The decomposition is preferably effected by means of ethyl chloroformate in water at ambient temperature or with gentle heating.

According to a still further feature of the invention, the isothiocyanate compounds of Formula I are prepared by the reaction of an alkali metal or ammonium salt of thiocyanic acid with a halogenated compound of the general formula:

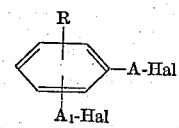
IV wherein Hal represents a halogen atom, and the other symbols are as hereinbefore defined. The reaction is preferably effected in water or an inert organic solvent, and using potassium or ammonium thiocyanate as reactant. It is preferably carried out with heating to avoid the formation of the corresponding thiocyanate.

The new isothiocyanate compounds of general Formula I possess useful chemotherapeutic properties; they are very active anthelmintics, particularly against the cestoda. Preferred compounds are those in which R represents a hydrogen atom, and, in particular, those compounds in which A represents a single bond, for example, 1-isothiocyanato-4-isothiocyanatomethylbenzene,
1-(5-isothiocyanato-1-pentyloxy)-4-isothiocyanatobenzene,
1-(2-isothiocyanato-1-ethoxy)-2-isothiocyanatobenzene,
1-(2-isothiocyanato-1-ethoxy)-4-isothiocyanatobenzene,
1-(3-isothiocyanato-1-propyl)-4-isothiocyanatobenzene,
1-(3-isothiocyanato-1-propoxy)-4-isothiocyanatobenzene,
1-(2-isothiocyanato-1-ethylthio)-4-isothiocyanatobenzene,
1-(2-isothiocyanato-1-ethylcarbamoyl)-4-isothiocyanatobenzene,
1-(2-isothiocyanato-1-ethylsulphonyl)-4-isothiocyanatobenzene,
1-(4-isothiocyanato-1-butoxy)-4-isothiocyanatobenzene, and
1-(2-isothiocyanato-acetylamino)-4-isothiocyanatobenzene.

Of outstanding importance are 1-(3-isothiocyanato-1-propoxy)-4-isothiocyanatobenzene and
1-(4-isothiocyanato-1-butoxy)-4-isothiocyanatobenzene.

The following examples illustrate the invention.

Example I

Thiophosgene (25.5 g.) is added slowly, with stirring, to a suspension of 4-aminomethyl-aniline (11.45 g.) and calcium carbonate (21.0 g.) in water (100 cc.), the temperature being kept between 0° and 20° C. When addition is complete, the reaction is allowed to continue for 16 hours at 25° C. Chloroform (200 cc.) is then added, stirred and a small quantity of insoluble material filtered off. The organic layer is decanted, dried over sodium sulphate and filtered. The chloroform is removed by distillation at 25 mm. Hg. The residue thus obtained (18.6 g.) is dissolved in methylene chloride (200 cc.) and the solution chromatographed through a column (4 cm. diameter) containing special chromatographic alumina (180 g.). The product retained in the column is eluted with methylene chloride (570 cc.) and the eluate is then evaporated to dryness at 25 mm. Hg giving, after recrystallisation from di-isopropyl ether (15 cc.), 1-isothiocyanato-4-isothiocyanatomethylbenzene (7.6 g.), M.P. 64° C.

The 4-aminomethyl-aniline used as starting material was prepared according to N. Kornblum and D. C. Iffland, J. Amer. Chem. Soc. 71, 2137 (1949).

Example II

Proceeding as in Example 1, but commencing with 1,4-bis-(aminomethyl)benzene (37.0 g.) and thiophosgene (70.9 g.), 1,4-bis-(isothiocyanatomethyl)benzene (33.4 g.), M.P. 64° C., is obtained after chromatography over alumina and recrystallisation from cyclohexane.

The 1,4-bis(aminomethyl)benzene used as starting material was prepared according to A. J. Yu and R. D. Evans, J. Amer. Chem. Soc., 81, 5361 (1959).

*Example III*

Proceeding as in Example I but commencing with 4-(5-amino-1-pentyloxy)aniline (26.7 g.) and thiophosgene (26.1 g.), 1-(5-isothiocyanato-1-pentyloxy)-4-isothiocyanatobenzene (13 g.), M.P. 57° C., is obtained after chromatography over alumina and recrystallisation from cyclohexane.

The 4-(5-amino-1-pentyloxy)aniline used as starting material was prepared according to J. N. Ashley, R. F. Collins, M. Davis and N. E. Sirett, J. Chem. Soc., p. 3880 (1959).

*Example IV*

Proceeding as in Example I but commencing with 1.4-bis-(2-amino-1-ethyl)benzene (17.0 g.) and thiophosgene (26.8 g.), 1,4-bis(2-isothiocyanato-1-ethyl)benzene (14.0 g.), M.P. 99° C., is obtained after chromatography over alumina and recrystallisation from cyclohexane.

The 1,4-bis(2-amino-1-ethyl)benzene used as starting material was prepared according to P. Ruggli and B. Prijs, Helv. Chim. Acta, 28, 674 (1945).

*Example V*

Thiophosgene (45.4 g.) is added to a solution of 2-(2-amino-1-ethoxy)aniline (27.5 g.) in 2.4 N-hydrochloric acid (450 cc.) and stirred at 25° C. for 16 hours. The reaction mixture is then extracted with chloroform (400 cc. total) and the chloroformic solution washed with saturated aqueous sodium bicarbonate solution (200 cc.) followed by water (150 cc.), dried over sodium sulphate and filtered. The solvent is removed by distillation at 25 mm. Hg and the oily residue (26 g.) dissolved in methylene chloride (260 cc.). The solution obtained is chromatographed through a column (diameter 4.8 cm.) containing special chromatographic alumina (400 g.). The product retained in the column is eluted with methylene chloride (1,750 cc.) and the eluate then evaporated to dryness at 25 mm. Hg. giving, after distillation at 0.2 mm. Hg, 1 - (2-isothiocyanato-1-ethoxy)-2-isothiocyanatobenzene (18 g.), M.P. 28–29° C., B.P. 145–155° C./0.2 mm. Hg.

The 2-(2-amino-1-ethoxy)aniline used as starting material was prepared according to A. Weddige, J. Prakt. Chem., 24, 241 (1881).

*Example VI*

Thiophosgene (23.5 g.) is added, slowly and with stirring, to a suspension of 1,4-bis(3-amino-1-propoxy)benzene (21 g.) and calcium carbonate (20.5 g.) in water (280 cc.), the temperature being kept between 5° and 10° C. At the completion of the addition (duration: 15 minutes), the reaction is allowed to continue with stirring for 16 hours at 25° C. Insoluble material is then filtered off and washed with water (400 cc. total). This insoluble material is taken up in methylene chloride (500 cc.), and stirred for 15 minutes. Insoluble material is filtered off and the organic solution dried over sodium sulphate. After filtration, the solvent is removed by distillation at 25 mm. Hg. The residue thus obtained (24 g.) is recrystallised from benzene (40 cc.) giving 1,4-bis(3-isothiocyanato-1-propoxy)benzene (8.8 g.), M.P. 110° C.

The 1,4-bis(3-amino-1-propoxy)benzene used as starting material was prepared by the hydrogenation in methanol in the presence of Raney nickel at 60° C. under 100 bars pressure, of 1,4-bis(2-cyano-1-ethoxy)benzene, prepared according to J. Colonge and A. Guyot, Bull. Soc. Chim., 1228 (1957).

*Example VII*

A solution of thiophosgene (34.6 g.) in methylene chloride (350 cc.) is added to a solution of 4-(2-amino-1-ethoxy)aniline (19.9 g.) in N hydrochloric acid (260 cc.). After externally cooling by means of a water-bath, sodium hydroxide solution (d.=1.33; 80 cc.) is added drop-wise over 2 hours in order to obtain a pH near 7. The organic layer is then decanted and the aqueous layer extracted with methylene chloride (250 cc. total). The combined organic layers are dried over sodium sulphate and, after filtering, the solvent is removed by distillation at 25 mm. Hg. Recrystallisation of the residue from a 1:10 benzene/cyclohexane mixture (220 cc.) gives 1-(2 - isothiocyanato - 1-ethoxy)-4-isothiocyanatobenzene (28.9 g.), M.P. 80° C.

The 4-(2-amino-1-ethoxy)aniline used as starting material was prepared by the reduction with stannous chloride of 4-(2-amino-1-ethoxy)nitrobenzene, itself prepared according to A. Weddige, J. Prakt. Chem., 24, 241 (1881).

*Example VIII*

Proceeding as in Example VII but commencing with 1,4-bis(2-amino-1-ethoxy)benzene dihydrochloride (25 g.) and thiophosgene (24.5 g.), 1,4-bis(2-isothiocyanato-1-ethoxy)benzene (19 g.), M.P. 120° C., is obtained after recrystallisation from a 1:2 benzene/cyclohexane mixture.

The 1,4-bis(2-amino-1-ethoxy)benzene used as starting material was prepared by the dephthalimidation, by means of hydrazine hydrate, of 1,4-bis(2-phthalimido-1-ethoxy)benzene, itself obtained by reaction of potassium phthalimide with 1,4-bis(2-bromo-1-ethoxy)benzene, prepared according to R. R. Renshaw and C. Y. Hopkins, J. Amer. Chem. Soc., 55, 1524 (1933).

*Example IX*

Proceeding as in Example VII but commencing with 4-(3-amino-1-propyl)aniline (10.9 g.) and thiophosgene (17.8 g.), 1 - (3 - isothiocyanato - 1-propyl)-4-isothiocyanatobenzene (9.4 g.), M.P. 50–51° C., is obtained after recrystallisation from a 2.5:1 cyclohexane/petroleum ether mixture.

The 4-(3-amino-1-propyl)aniline used as starting material was prepared according to T. M. Patrick et al., J. Amer. Chem. Soc. 68, 1153 (1946).

*Example X*

Proceeding as in Example VII but commencing with 4-(3-amino-1-propoxy)aniline (22.5 g.) and thiophosgene (34.1 g.), 1 - (3 - isothiocyanato-1-propoxy)-4-isothiocyanatobenzene (19.8 g.), M.P. 66° C., is obtained after recrystallisation from cyclohexane.

The 4-(3-amino-1-propoxy)aniline starting material was prepared according to M. Ishidate et al., J. Pharm. Soc. Japan, 72, 88 (1952).

*Example XI*

Proceeding as in Example VII but with 4-(2-amino-1-ethylthio)aniline (20 g.) and thiophosgene (31.5 g.), 1-(2-isothiocyanato - 1 - ethylthio) - 4 - isothiocyanatobenzene (13.2 g.), M.P. 38–39° C., is obtained after chromatography over alumina in a 1:1 benzene/cyclohexane mixture followed by recrystallisation from cyclohexane.

The 4 - (2 - amino-1-ethylthio)aniline starting material was prepared by the hydrogenation in ethanol, in the presence of Raney nickel at 20° C. under 20 bars pressure, of 4-(2-amino-1-ethylthio)nitrobenzene, itself prepared by the reaction of ethyleneimine with 4-nitro-thiophenol.

*Example XII*

Proceeding as in Example VI but commencing with 4-(2 - amino - 1 - ethylcarbamoyl)aniline dihydrochloride (31.6 g.), thiophosgene (30.4 g.) and calcium carbonate (50.4 g.), 1 - (2 - isothiocyanato-1-ethylcarbamoyl)-4-isothiocyanatobenzene (19.7 g.), M.P. 127–128° C., is obtained after recrystallisation from benzene.

The 4-(2-amino-1-ethylcarbamoyl)aniline starting material was prepared by the hydrogenation in methanol, in the presence of Raney nickel at 20° C. under 10 bars pressure, of 4-(2-amino-1-ethylcarbamoyl)nitrobenzene, M.P. 140–141° C., itself obtained by the condensation of 4-nitrobenzoyl chloride with ethylenediamine.

*Example XIII*

Proceeding as in Example VI but commencing with 4-(2-amino-1-ethylsulphonyl)aniline (20 g.), thiophosgene (22.8 g.) and calcium carbonate (20 g.), 1-(2-isothiocyanato - 1 - ethylsulphonyl)-4-isothiocyanatobenzene (11.4 g.), M.P. 97–98° C., is obtained after chromatography over alumina in benzene followed by recrystallisation from a 1:1 benzene/hexane mixture.

The 4-(2-amino-1-ethylsulphonyl)aniline starting material was prepared according to A. A. Goldberg, J. Chem. Soc., 826 (1945).

*Example XIV*

Proceeding as in Example VII but commencing with 4-(4-amino-1-butoxy)aniline (12.1 g.) and thiophosgene (17 g.), 1-(4-isothiocyanato-1-butoxy)-4-isothiocyanatobenzene (6.7 g.), M.P. 37–38° C., is obtained after recrystallisation from heptane.

The 4-(4-amino-1-butoxy)aniline starting material was prepared by the dephthalimidation with hydrazine hydrate of 4-(4-phthalimido-1-butoxy)aniline, itself prepared according to J. N. Ashley et al., J. Chem. Soc., 3880 (1959).

*Example XV*

Proceeding as in Exmple VI but commencing with 4-(2-amino-acetylamino)aniline dihydrochloride (2.4 g.), calcium carbonate (4.2 g.) and thiophosgene (2.5 g.), 1-(2-isothiocyanato-acetylamino)-4-isothiocyanatobenzene (0.3 g.), M.P. 186° C., is obtained after chromatography over alumina in methylene chloride followed by recrystallisation from ethyl acetate.

The 4-(2-amino-acetylamino)aniline starting material was prepared by reaction of 2-phthalimidoacetyl chloride with 4-nitroaniline followed by the hydrogenation of the product obtained, in dimethylformamide in the presence of Raney nickel at 20° C. under 10 bars pressure, to give 4-(2-phthalimido-acetylamino)aniline which is then dephthalimidated by means of hydrazine hydrate.

The invention further includes within its scope therapeutically useful, more especially veterinary, compositions which comprise at least one isothiocyanate compound of Formula I together with a significant amount of a non-toxic carrier, which may be either a solid material or a liquid, or coating. In practice the compounds of the present invention as anthelmintics will normally be administered orally, in consequence of which the preferred compositions are those suitable for oral administration.

Solid compositions for oral administration include compressed tablets, pills, dispersible powders, and granules. In such solid compositions the active compound is admixed with at least one inert diluent such as calcium carbonate, potato starch, alginic acid, sucrose, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and preserving, perfuming, sweetening and flavouring agents. The compositions according to the invention for oral administration include capsules of absorbable material such as gelatin containing the active substance with or without the addition of diluents or excipients.

For the treatment of animals the isothiocyanate compounds may be incorporated in the animal foodstuff, i.e. an organic or mineral substance which is intended to be fed to the animals, or drinking water. Incorporation of the active ingredient in the foodstuff may be effected by mixing the isothiocyanate with the foodstuff or by dissolving or dispersing the isothiocyanate in an organic medium before addition to the foodstuff. The isothiocyanates may be mixed as such with drinking water or added in solution or dispersion in an organic medium to the water.

We claim:

1. An isothiocyanate compound of the formula:

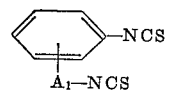

where $A_1$ represents alkylene of 1 to 6 carbon atoms attached to the phenyl nucleus either directly or through —O—, —S—, —SO$_2$—, —NHCO— or —CONH—.

2. 1 - (5 - isothiocyanato - 1 - pentyloxy) - 4 - isothiocyanatobenzene.

3. 1 - (2 - isothiocyanato - 1 - ethoxy) - 4 - isothiocyanatobenzene.

4. 1 - (3 - isothiocyanato - 1 - propyl) - 4 - isothiocyanatobenzene.

5. 1 - (3 - isothiocyanato - 1 - propoxy) - 4 - isothiocyanatobenzene.

6. 1 - (4 - isothiocyanato - 1 - butoxy) - 4 - isothiocyanatobenzene.

References Cited

UNITED STATES PATENTS

| | | | |
|---|---|---|---|
| 2,027,967 | 12/1934 | Elmslie et al. | 167—53 |
| 2,033,495 | 3/1936 | Taylor et al. | 167—53 |
| 2,080,770 | 3/1937 | Goldschmidt et al. | 167—30 |
| 2,313,945 | 3/1943 | Kellogg et al. | 260—93 |
| 2,339,050 | 1/1944 | Carson | 260—454 |
| 2,411,869 | 12/1946 | Bruson | 260—454 |
| 3,111,536 | 11/1963 | Tarlton et al. | 260—454 |
| 3,198,821 | 8/1965 | Brotherton et al. | 260—454 |

OTHER REFERENCES

Boshuizen, G.: Chemical Abstracts, vol. 62, March 1965, p. 5229e.

CHARLES B. PARKER, *Primary Examiner.*

D. MAHANAND, D. H. TORRENCE,

*Assistant Examiners.*